F. DE C. THOMPSON.
SECTIONAL TRUNK.
APPLICATION FILED NOV. 18, 1913.
1,101,357.
Patented June 23, 1914.
2 SHEETS—SHEET 1.
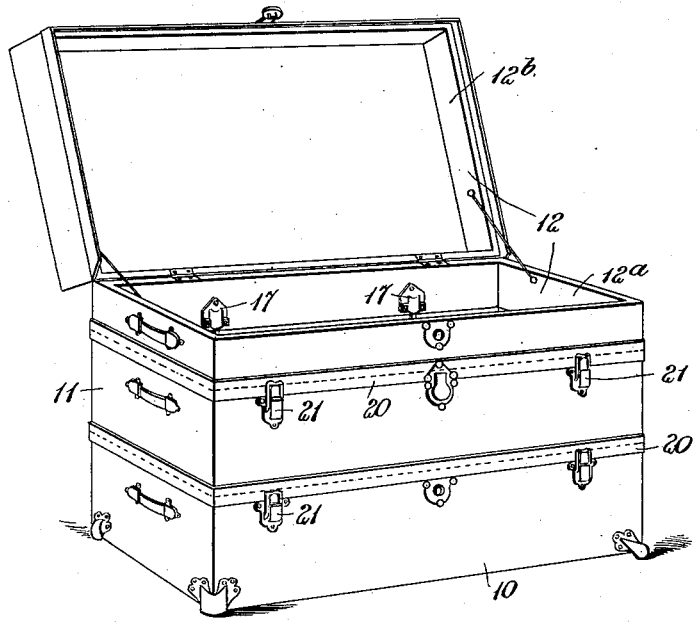
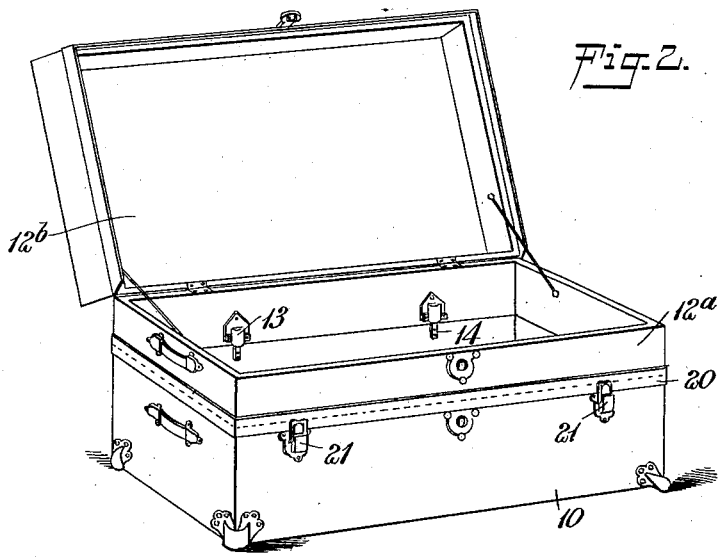
WITNESSES
William P. Goebel
Geo. L. Beeler
INVENTOR
Ford DeCamp Thompson
BY Munn & Co
ATTORNEYS F. DE C. THOMPSON.
SECTIONAL TRUNK.
APPLICATION FILED NOV. 18, 1913.
1,101,357.
Patented June 23, 1914.
2 SHEETS—SHEET 2.
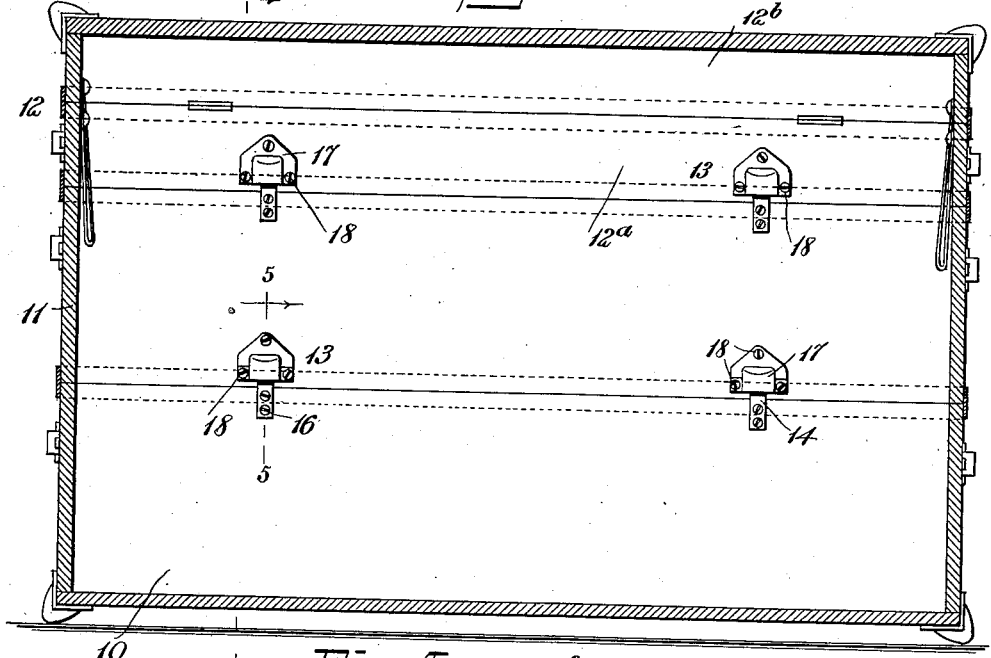
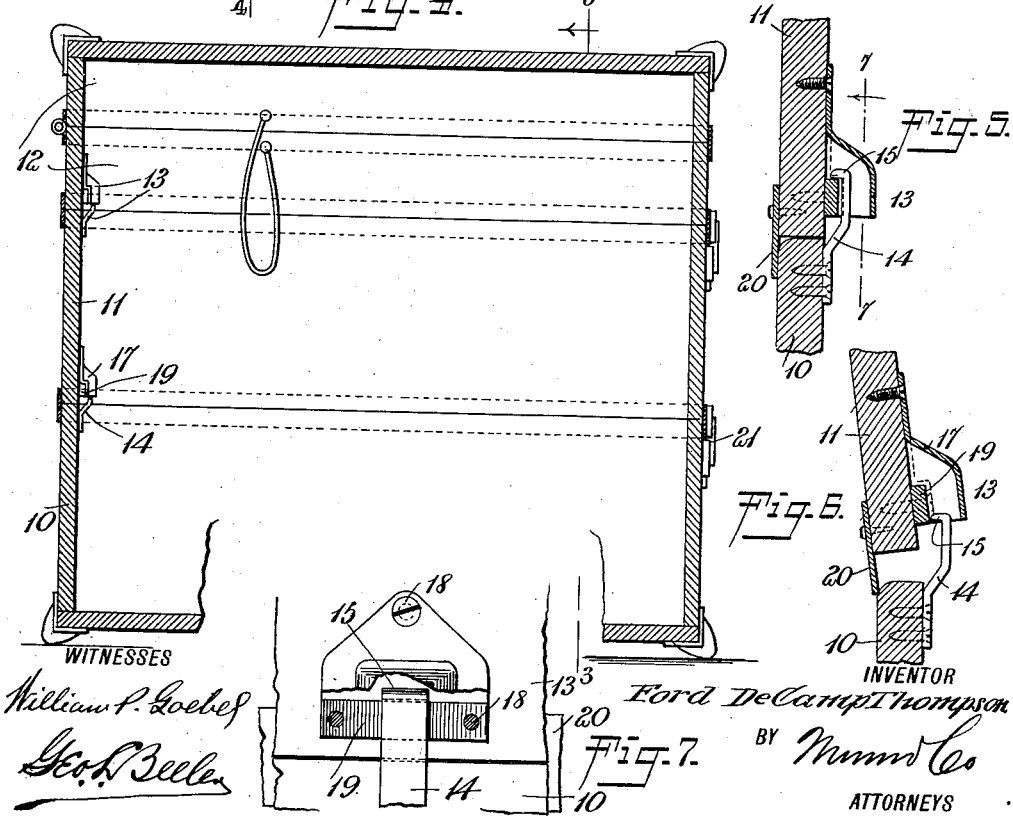
WITNESSES
William P. Loebef
Geo. L. Beller
INVENTOR
Ford DeCamp Thompson
BY Munn & Co.
ATTORNEYS

UNITED STATES PATENT OFFICE.

FORD DE CAMP THOMPSON, OF NEW YORK, N. Y.

SECTIONAL TRUNK.

1,101,357.  Specification of Letters Patent. Patented June 23, 1914.

Application filed November 18, 1913. Serial No. 801,637.

*To all whom it may concern:*

Be it known that I, FORD DE CAMP THOMPSON, a citizen of the United States, and a resident of the city of New York, borough of Brooklyn, in the county of Kings and State of New York, have invented a new and Improved Sectional Trunk, of which the following is a full, clear, and exact description.

This invention relates to baggage and has particular reference to trunks or traveling cases constructed in sections whereby the case as a whole may be enlarged or reduced in capacity according to the needs at any particular time.

More definitely stated, the invention includes a trunk, and by the term "trunk" as used herein I wish it to be understood as intending to cover any device analogous to a trunk, the same being made of a plurality of detachable parts and provided with symmetrically arranged fastening devices whereby I may employ all of said sections in one construction or any number less than the whole.

The foregoing and other objects of the invention will hereinafter be more fully described and claimed and illustrated in the drawings forming a part of this specification in which like characters of reference indicate corresponding parts in all the views, and in which—

Figure 1 is a perspective view of a trunk complete with a series of detachable parts; Fig. 2 is a similar view showing the trunk complete but with an intermediate section removed, making the trunk shallower in capacity; Fig. 3 is a vertical longitudinal section, on the line 3—3 of Fig. 4, of a trunk corresponding to that shown in Fig. 1; Fig. 4 is a vertical transverse section on the line 4—4 of Fig. 3; Fig. 5 is a sectional detail on the line 5—5 of Fig. 3; Fig. 6 is a view similar to Fig. 5 but indicating the relative positions of the parts in the act of connecting or disconnecting; and Fig. 7 is a detail as viewed from the line 7—7 of Fig. 5.

The several parts of the device may be made of any suitable materials, and the relative sizes and proportions, as well as the general design of the mechanism, may be varied to a considerable extent without departing from the spirit of the invention hereinafter more fully set forth and specifically claimed.

A trunk made in accordance with this invention includes a substantially rectangular bottom 10 of any suitable construction; one or more intermediate removable sections 11, and a top section 12 adapted to be attached to the upper edge of the intermediate section as shown in Fig. 1 or to the top edge of the bottom section as shown in Fig. 2.

Any or all of these sections may obviously be provided with horizontal partitions serving as trays or for tray supports, but such devices constituting no part of this invention they are not illustrated.

In a detachable sectional trunk it is important and essential that the attaching means for the several parts must be both simple and reliable in use and of such a nature as to be quickly manipulated. I provide, therefore, for this purpose a set of peculiarly constructed catch members 13 arranged preferably along the rear wall of the trunk, each of said members including a finger 14 having a hook 15 at one end and secured at its other end, as by means of screws 16, to one of the trunk parts adjacent the line of connection between two adjacent parts, the fingers projecting across said line. The device 13 also includes a keeper 17, in the nature of a housing of comparatively light but stiff material rigidly connected as by means of screws 18 to the other of said adjacent parts and serving normally to inclose the hooked end 15 of the finger. Said keeper includes also a strong bar 19 extending longitudinally of the wall of the section to which the keeper is connected and secured in place by the lowermost screws 18. Said bar constitutes, therefore, a strong and reliable shoulder for interlocking engagement with the aforesaid hook 15. The finger member 14 may be secured to either a lower or an upper section to be connected together, and the keeper portion of the fastener will, of course, be connected to the other of such sections. I prefer, however, for the fingers to be connected in such a manner as to project upwardly from the section to which they are connected because since they project beyond the dividing line of adjacent sections, if they were connected so as to project downwardly, they would be caused thereby to sustain the weight of any section made to stand or rest upon the floor, table or the like, with the result that such fingers might become bent or broken or made to mar the floor or furniture.

Any section intended by the operation of this invention to be detachably connected to a lower section is furnished on its lower edge with a downwardly projecting guard 20 made preferably of strap iron or the like. Said guard is secured along its upper edge to the lower edge or rim of the section which carries it, and is intended to overlap the upper edge of the next adjacent lower section. This guard serves therefore as a means for steadying the joint between two detachable sections insuring a positive action of the hook connections and also serves as a means for facilitating the connection of any section to the next lower section; that is to say, when applying a section to the lower section, the section being applied will be grasped and brought into the position indicated in Fig. 6, the guard 20 serving to locate or position the section being manipulated so as to bring the keepers 17 in precise vertical alinement with the hooks 15. When the section is dropped, therefore, into position upon the upper edge of the lower section, the hooks will automatically engage and hold as shown in Fig. 5. Any suitable outside quick-acting hasps, such as indicated at 21 and now in common use on trunks, valises and the like, may be employed to detachably hold the front parts of the adjacent sections detachably together. So long as the said front parts are so held, it will be impossible for the hooks and keepers to be disconnected.

The top section 12 of the trunk comprises a rim 12$^a$ and a lid 12$^b$ shown as hinged together in any suitable or approved manner and for the usual purposes. The rim portion 12$^a$ may be regarded as one of the removable sections within the spirit of the foregoing description. It, therefore, carries a plurality of keepers 17, the same as any other section, and said keepers will bear the same relation to the fingers 14 secured to the bottom section as they do to the hooks of any other section whereby the removable parts are all interchangeable, adapting the trunk to any desired depth.

To transform the trunk shown in Fig. 1 into the form shown in Fig. 2, the hasps 21 connecting the top section to the intermediate section will be opened and the top section may then be lifted directly from the intermediate section 11, such action including a slight backward tilt, as shown in Fig. 6, to release the hooks. The intermediate section 11 may then be removed from the bottom section in precisely the same manner and set aside. The top section then in turn will be replaced directly upon the bottom section by a process the reverse of that just described and there secured by closing the hasps 21 carried by the bottom section. The action of the lid with respect to its hinges and securing means is independent of the attaching and detaching devices for the several detachable sections.

Having thus described my invention, I claim as new and desire to secure by Letters Patent:—

In a sectional trunk, the combination of a bottom section and an upper section detachably connected thereto, said upper section having secured to its lower edge a guard serving to overlap the upper edge of the bottom section and thereby preventing lateral displacement of either section with respect to the other, a plurality of keepers connected to one of said sections adjacent the edge thereof having the guard, each keeper including a longitudinally arranged bar forming a shoulder, a plurality of fingers connected to the other section and extending across the line joining the sections, said fingers terminating in hooks engaging over said bars, said keepers and fingers being secured at definite positions on one wall of the trunk, and one or more hasps secured on the opposite wall of the trunk and serving to prevent unintentional detachment of the fingers and keepers, substantially as set forth.

In testimony whereof I have signed my name to this specification in the presence of two subscribing witnesses.

FORD DE CAMP THOMPSON.

Witnesses:
S. C. THOMPSON,
FRED WM. HEINRICH.

Copies of this patent may be obtained for five cents each, by addressing the "Commissioner of Patents, Washington, D. C."